United States Patent Office 2,860,138
Patented Nov. 11, 1958

2,860,138

CARBAMATE ESTERS OF HYDROXYALKYL PIPERAZINO ALKYL PHENOTHIAZINES

Margaret H. Sherlock, Bloomfield, and Nathan Sperber, North Caldwell, N. J., assignors to Schering Corporation, Bloomfield, N. J., a corporation of New Jersey No Drawing. Application November 21, 1956
Serial No. 623,547

5 Claims. (Cl. 260—243)

This invention relates to a new group of piperazine compounds which have valuable therapeutic properties. More particularly, our invention relates to carbamate esters of 1-(hydroxy lower alkyl)-4-[3-(10-phenothiazinyl)-propyl]-piperazine which possess a chlorine or bromine atom at position 2 of the phenothiazine nucleus. The new compounds of our invention are bases represented by the following structural formula and include the non-toxic acid addition salts thereof:

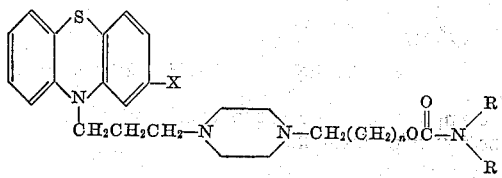

wherein X represents a halogen atom having an atomic number greater than 9 but less than 53, R is a member of the group consisting of hydrogen and lower alkyl groups whose combined number of carbon atoms is less than 6, and $n$ is a natural number less than 3. The new compounds of our invention are extremely potent ataraxic agents and are useful in treating or controlling emesis. The carbamate esters are approximately 3 to 6 times as potent as the free alcohol in producing an ataraxic or tranquillizing effect, while the dialkylcarbamate esters are 2 to 3 times as potent as the free alcohol. In view of their increased potency, without any significant increase in toxicity, a substantial increase in therapeutic ratio is achieved.

The piperazine compounds of the general formula wherein R is a lower alkyl group, can be prepared by esterifying the free alcohol with a dialkylcarbamyl halide such as dimethylcarbamyl chloride. The esterification is preferably carried out in an inert solvent like toluene or xylene in the presence of a basic agent such as sodamide or sodium or carried out in pyridine solvent.

The carbamate esters, that is, when R is hydrogen, are prepared by dissolving the phenylcarbonate ester of the free alcohol in liquid ammonia whereby the phenoxy group is replaced by —$NH_2$.

Our new piperazine derivatives, in view of their relative insolubility in water, are preferably transformed into a soluble pharmaceutically acceptable salt. The compounds form salts with a variety of inorganic and strong organic acids such as hydrochloric, maleic, citric, tartaric, phosphoric, sulfuric and related acids.

The following examples are illustrative of methods for preparing our novel compounds. However, our invention is not to be construed as limited thereby, the sole limitation being the appended claims.

EXAMPLE A

Preparation of the free alcohols 1-(2-HYDROXYETHYL)-4-[3-(2-CHLORO-10-PHENOTHIAZINYL)-PROPYL]-PIPERAZINE To a suspension of sodamide (from 3 g. of sodium) in 300 ml. of liquid ammonia, there is added 30 g. of 2-chlorophenothiazine. After stirring for one hour, 19 g. of 1-bromo-3-chloropropane is added. The ammonia is allowed to evaporate and to the residue there is then added 200 ml. of water. The oily layer which separates is extracted with ether. The ether extracts are dried over anhydrous sodium sulfate, filtered and concentrated. 10-(3-chloropropyl)-2-chlorophenothiazine is obtained in the form of a crude oil.

A mixture of 25 g. of 1-(2-hydroxyethyl)-piperazine and 15 g. of the crude 10-(3-chloropropyl)-2-chlorophenothiazine obtained above is heated for 18 hours on a steam bath. The mixture is decomposed by the addition of 200 ml. of water and the aqueous mixture is extracted several times with ether. The ether layer is then extracted with dilute hydrochloric acid. The acid layer is basified with sodium hydroxide solution and the resulting oil is extracted with ether. The ether extracts are dried, concentrated and the residue distilled, yielding the free alcohol of this example, an oil having a B. P. of 278–281° C. (1.0 mm.). Its dihydrochloride prepared in ethanolic hydrogen chloride melts at 225–226° C. after recrystallization from ethanol.

By substituting 2-bromophenothiazine in the foregoing reaction there is obtained 1-(2-hydroxyethyl)-4-[3-(2-bromo-10-phenothiazinyl)-propyl]-piperazine, B. P. 282–284°/1 mm., M. P. 97–98° C., M. P. of dihydrochloride 224–225° C. from ethanol.

1 - (3-hydroxypropyl)-4-[3-(2-chloro-10-phenothiazinyl)-propyl]-piperazine, M. P. 104–105° C. (from ethyl acetate) and 1 - (3 - hydroxypropyl) - 4-[3-(2-bromo-10-phenothiazinyl)-propyl]-piperazine are obtained by substituting 1-(3-hydroxypropyl)-piperazine for 1-(2-hydroxyethyl)-piperazine in the following procedures.

EXAMPLE 1

Carbamate of 1-(2-hydroxyethyl) - 4-[3 - (2-chloro-10-phenothiazinyl)-propyl]-piperazine The requisite intermediate, the phenylcarbonate ester is prepared as follows: To a solution of 40 g. of 1-(2-hydroxyethyl)-4-[3-2-chloro-10-phenothiazinyl)-propyl]-piperazine in 50 ml. of anhydrous pyridine is added, with cooling, 17.2 g. of phenyl chlorocarbonate, keeping the temperature between 25° and 30° C. After stirring at room temperature overnight, 50 ml. of water is added and the mixture is extracted with chloroform. The chloroform extracts are washed several times with water, dried over sodium sulfate, and concentrated in vacuo to a viscous residue consisting of the phenylcarbonate ester of the before-mentioned alcohol.

A solution of 30 g. of the crude phenylcarbonate, obtained above, in 100 ml. of anhydrous ether is added slowly to 500 ml. of liquid ammonia with stirring, in an insulated flask. The reaction mixture is stirred for ten hours after which time all the ammonia has evaporated. To the residue there is added 200 ml. of water and the mixture is extracted with ether. The ether extracts are washed with dilute sodium carbonate solution and water; dried over sodium sulfate and concentrated to a residue, consisting of a viscous oil which solidifies upon standing. Recrystallization from benzene-petroleum ether yields the carbamate ester of this example, M. P. 88–89° C.

The dihydrochloride, which is prepared in absolute ethanol with ethanolic hydrogen chloride, melts at 227–228° C., after crystallization from alcohol.

EXAMPLE 2

Dimethyl carbamate of 1-(2-hydroxyethyl)-4-[3-(2-chloro-10-phenothiazinyl)-propyl]-piperazine A mixture of 40 g. of 1-(2-hydroxyethyl)-4-[3-(1-chloro-10-phenothiazinyl)-propyl]-piperazine, 2.6 g. of powdered sodium and 250 ml. of toluene is stirred and refluxed for 3 hours. To the cooled mixture there is added, with stirring, 13 g. of dimethylcarbamyl chloride.

After refluxing for 3 hours, the mixture is cooled and treated with water. The toluene layer is separated, dried and concentrated in vacuo, yielding the ester of this example as a viscous yellow oil.

The ester is converted to its dihydrochloride which melts at 227–228° C., after recrystallization from ethanol.

EXAMPLE 3

*Diethyl carbamate of 1-(3-hydroxypropyl)-4-[(2-chloro-10-phenothiazinyl)-propyl]-piperazine*

The ester of this example is prepared from the sodium salt (from 1.3 g. of sodium) of 20.5 g. of 1-(3-hydroxypropyl)-4-[3-(2-chloro-10-phenothiazinyl)-propyl]-piperazine and 6.5 g. of diethylcarbamyl chloride according to the procedure of Example 2.

The free base is converted to its dihydrochloride in ethanol with ethanolic hydrogen chloride. The dimaleate is prepared by adding an ethyl acetate solution of the ester to an ethyl acetate solution of maleic acid. The salt separates upon cooling the mixture and is removed by filtration. Purification is effected by recrystallization from ethanol.

EXAMPLE 4

*Carbamate of 1-(3-hydroxypropyl)-4-[3-(2-bromo-10-phenothiazinyl)-propyl]-piperazine*

The ester of this example is prepared from 38 g. of 1-(3-hydroxypropyl)-4-[3-(2-bromo-10-phenothiazinyl)-propyl]-piperazine and 17.2 g. of phenyl chlorocarbonate, followed by the reaction of the phenylcarbonate with liquid ammonia as in Example 1. The free base is isolated as the dihydrochloride with ethanolic hydrogen chloride.

EXAMPLE 5

*Carbamate of 1-(2-hydroxyethyl)-4-[3-(2-bromo-10-phenothiazinyl)-propyl]-piperazine*

The ester of the example is prepared from 22.4 g. of 1-(2-hydroxyethyl)-4-[3-(2-bromo-10-phenothiazinyl)-propyl]-piperazine and 17.2 g. of phenyl chlorocarbonate followed by ammonolysis of the crude phenylcarbonate as in Example 1.

We claim:

1. Pharmaceutically acceptable acid addition salts of bases having the formula:

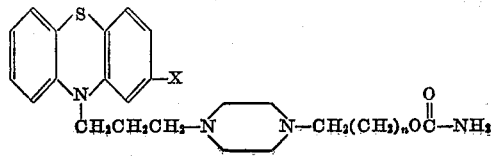

wherein X is a halogen atom having an atomic number greater than 9 but less than 53, and n is a natural number less than 3.

2. Carbamate of 1-(2-hydroxyethyl)-4-[3-(2-chloro-10-phenothiazinyl)-propyl]-piperazine having the formula:

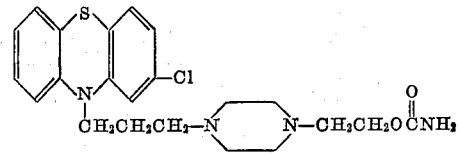

3. Carbamate of 1-(3-hydroxypropyl)-4-[3-(2-bromo-10-phenothiazinyl)-propyl]-piperazine having the formula:

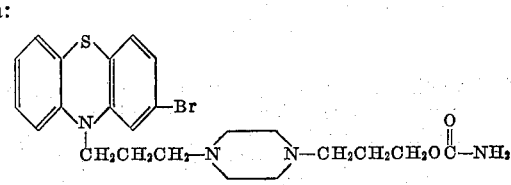

4. Carbamate of 1-(2-hydroxyethyl)-4-[3-(2-bromo-10-phenothiazinyl)-propyl]-piperazine having the formula:

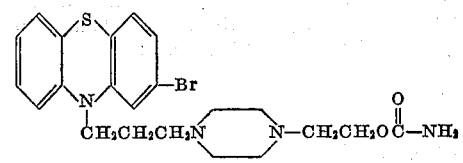

5. Compounds of the group consisting of bases having the following formula:

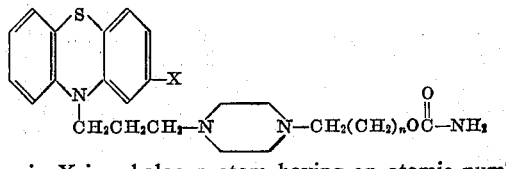

wherein X is a halogen atom having an atomic number greater than 9 but less than 53 and n is a natural number less than 3 and the pharmaceutically acceptable acid addition salts thereof.

References Cited in the file of this patent

UNITED STATES PATENTS 2,766,235   Cusic _____ Oct. 9, 1956

FOREIGN PATENTS 203,708   Australia _____ Oct. 20, 1955